(12) United States Patent
Nevin et al.

(10) Patent No.: US 8,663,852 B2
(45) Date of Patent: Mar. 4, 2014

(54) AEROBIC MICROBIAL FUEL CELL

(75) Inventors: Kelly Nevin, Amherst, MA (US); Derek Lovley, Leyden, MA (US)

(73) Assignee: University of Massachusetts, Boston, MA (US)

(*) Notice: Subject to any disclaimer, the term of this patent is extended or adjusted under 35 U.S.C. 154(b) by 521 days.

(21) Appl. No.: 12/976,235

(22) Filed: Dec. 22, 2010

(65) Prior Publication Data

US 2012/0164544 A1    Jun. 28, 2012

(51) Int. Cl.
*H01M 8/16* (2006.01)
*H01M 4/86* (2006.01)

(52) U.S. Cl.
USPC .......................... 429/401; 429/523

(58) Field of Classification Search
None
See application file for complete search history.

(56) References Cited

U.S. PATENT DOCUMENTS

2008/0286624 A1* 11/2008 Lovley et al. .................. 429/27
2009/0297890 A1* 12/2009 Shimomura et al. .............. 429/2

OTHER PUBLICATIONS

Bi, W. et al. (2009). "The effect of humidity and oxygen partial pressure on degradation of Pt/C catalyst in PEM fuel cell" Electrochimica Acta 54: 1826-1833.
Bond, D. R. et al. (2002). "Electrode-reducing microorganisms that harvest energy from marine sediments." Science 295(5554): 483-485.
Bond, D. R. and D. R. Lovley (2003). "Electricity production by *Geobacter sulfurreducens* attached to electrodes." Appl. Environ. Microbiol. 69: 1548-1555.
Coppi, M.V. et al., Development of a Genetic System for *Geobacter sulfurreducens*, Applied and Environmental Microbiology, Jul. 2001, p. 3180-3187.
Erable, B. and A. Bergel (2009). "First air-tolerant effective stainless steel microbial anode obtained from a natural marine biofilm." Bioresource Technology 10(13): 3302-3307.
Leang, C. et al. (2010). "Role of cytochrome bd ubiquinol oxidase in scavenging oxygen during low levels of oxygen exposure in *Geobacter sulfurreducens*." (submitted).
Lee, W. J. and D. H. Park (2009). "Electrochemical activiation of nitrate reduction to nitrogen by *Ochrobactrum* sp. G3-1 using a noncompartmented electrochemical bioreactor." J. Microbio. Biotechnol. 19: 836-844.
Lin, W. C. et al. (2004). "*Geobacter sulfurreducens* can grow with oxygen as a terminal electron acceptor." Appl Environ Microbiol 70: 2525-2528.
Liu, H. and Logan, B.E., Electricity Generation Using an Air-Cathode Single Chamber Microbial Fuel Cell in the Presence and Absence of a Proton Exchange Membrane, Environ. Sci. Technol. 2004, 38, 4040-4046.

(Continued)

*Primary Examiner* — Jonathan Crepeau
(74) *Attorney, Agent, or Firm* — Milstein Zhang & Wu LLC; Joseph B. Milstein

(57) ABSTRACT

An aerobic microbial fuel cell anode electrode, a fuel cell using the anode, and methods of use. An anode electrode having a conductive exterior surface and having sufficient porosity to allow a fuel-bearing liquid flowing in a cavity within the anode to escape and to supply fuel to a biologically active microbe film grown on the exterior of the anode is situated in the fuel cell. When operated in an aerobic environment, such as water, the anode and a cathode can supply electrical power to a load without the need for a semi-permeable membrane between the anode and the cathode. Several embodiments in which the anode electrode is machined from a graphite block or cylinder are described. Conditions for growing the biologically active film and for operating the fuel cell are described.

9 Claims, 16 Drawing Sheets

(56) References Cited

OTHER PUBLICATIONS

Lovley, D. R. and K. P. Nevin (2008). Electricity production with electricigens. Bioenergy. J. D. Wall, C. S. Harwood and D. A.L. Washington, DC, ASM Press: 295-306.

Lowy, D. et al. (2006). "Harvesting energy from the marine sediment-water interface II—Kinetic activity of anode materials." Biosens Bioelectron 2111: 2058-2063.

Marshall, C. W. and May, H.D. (2009). "Electrochemical evidence of direct electrode reduction by a thermophilic Gram-positive bacterium, Thermincola ferriacetica." Energy Environ. Sci. 2: 699-705.

Marsili, E. et al. (2008). "*Shewanella* secretes flavins that mediate extracellular electron transfer." PNAS 105: 3968-3973.

Nevin, K. P. and D. R. Lovley (2002). "Mechanisms for Fe(III) oxide reduction in sedimentary environments." Geomicrobiol. J. 19: 141-159.

Nevin, K. P. et al. (2008). "Power output and columbic efficiencies from biofilms of *Geobacter sulfurreducens* comparable to mixed community microbial fuel cells." Environ. Microbiol. 10: 2505-2514.

Reguera, G. et al. Biofilm and Nanowire Production Leads to Increased Current in *Geobacter sulfurreducens* Fuel Cells, Applied and Environmental Microbiology, Nov. 2006, p. 7345-7348.

Reimers, C. E. et al. (2001). "Harvesting energy from the marine sediment—water interface." Environ Sci Technol 35 (1): 192-5.

Ringeisen, B. R. et al. (2007). "A miniature microbial fuel cell operating with an aerobic anode chamber" Journal of Power Sources 165(2): 591-597.

Rosenbaum, M. et al. (2010). "Cathodes as electron donors for microbial metabolism: which extracellular electron transfer mechanisms are involved?" Bioresource Technology doi:10.1016/j.biortech.2010.07.008.

Tender, L. M., et al. (2008). "The first demonstration of a microbial fuel cell as a viable power supply: powering a meteorological buoy." J. Power Sources 179: 571-575.

Tender, L. M., et al. (2002). "Harnessing microbially generated power on the seafloor." Nat. Biotechnol. 20(8): 821-825.

Von Canstein, et al. (2008). "Secretion of flavins by *Shewanella* species and their role in extracellular electron transfer." Appl Environ Microbiol 74: 615-623.

Wang, X. et al., Electricity production from beer brewery wastewater using single chamber microbial fuel cell, Water Science & Technology—WST | 57.7 | 2008 pp. 1117-1121.

Yi, H., K. P. Nevin, et al. (2009). "Selection of a variant of *Geobacter sulfurreducens* with enhanced capacity for current production in microbial fuel cells." Biosensors Bioelectron. 24: 3498-3503.

\* cited by examiner

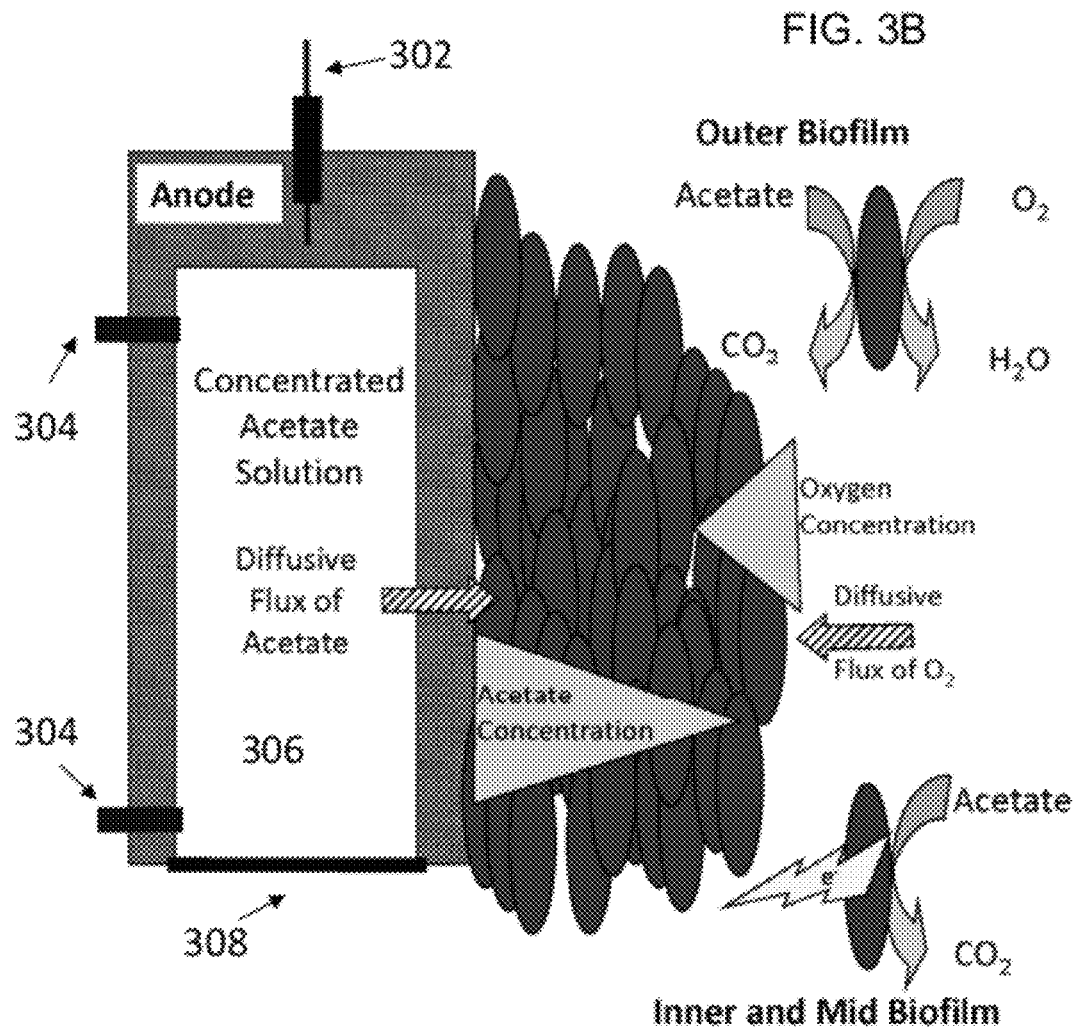

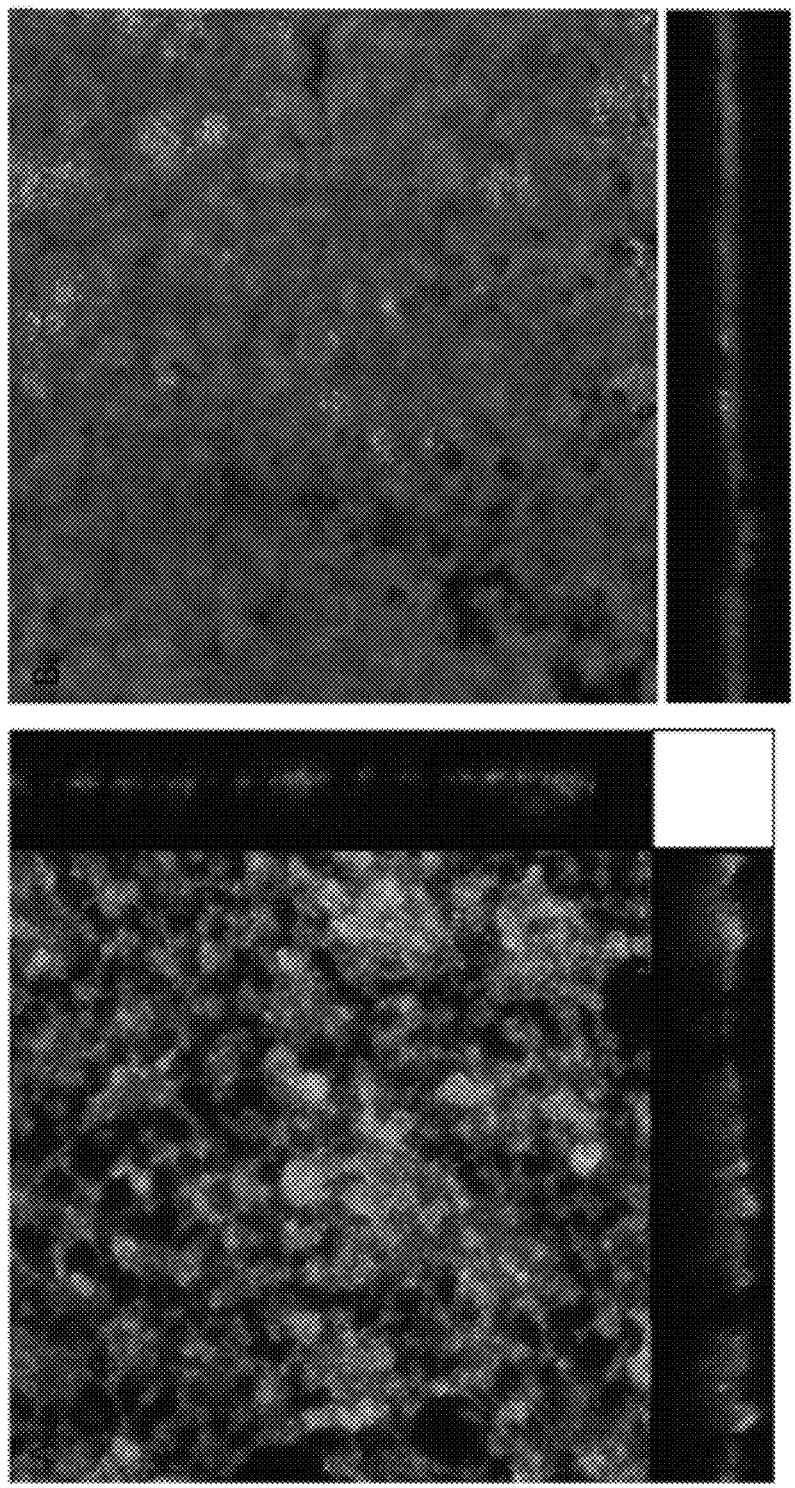

AEROBIC MICROBIAL FUEL CELL

STATEMENT REGARDING FEDERALLY FUNDED RESEARCH OR DEVELOPMENT

The U.S. Government has certain rights in this invention pursuant to Grant No. N00014-09-1-0216 awarded by the Office of Naval Research.

FIELD OF THE INVENTION

The invention relates to fuel cells in general and particularly to a microbial fuel cell that operates under aerobic conditions.

BACKGROUND OF THE INVENTION

One of the limitations of power generation with microbial fuel cells is that the anode chamber must typically be maintained under anaerobic conditions. When oxygen is present in the anode chamber the system is short-circuited because microorganisms oxidize the fuel with the reduction of oxygen rather than electron transfer to the anode. Generally, the anaerobes that would be present on the anode surface under anaerobic conditions are inactivated by oxygen. The need to separate the anaerobic anode chamber from the aerobic cathode chamber creates other electrochemical limitations, such as slow diffusion of protons from the anode to the cathode, which can further limit current production.

Although many potential large-scale applications for producing electrical power with microbial fuel cells have been proposed, at the present stage of development the short-term practical deployment of microbial fuel cells appears limited to localized powering of electronic devices in remote locations (Lovley, D. R. and K. P. Nevin (2008). Electricity production with electricigens. *Bioenergy*. J. D. Wall, C. S. Harwood and D. A. L. Washington, D.C., ASM Press: 295-306). For example, sediment fuel cells are simple, effective devices that can extract electrons from organic matter naturally present in the aquatic sediments (Reimers, C. E., T. L M, et al. (2001). "Harvesting energy from the marine sediment—water interface." *Environ Sci Technol* 35(1): 192-5; Bond, D. R., D. E. Holmes, et al. (2002). "Electrode-reducing microorganisms that harvest energy from marine sediments." *Science* 295(5554): 483-5; Tender, L. M., C. E. Reimers, et al. (2002). "Harnessing microbially generated power on the seafloor." *Nat. Biotechnol.* 20(8): 821-5; Lowy, D., L. Tender, et al. (2006). "Harvesting energy from the marine sediment-water interface II—Kinetic activity of anode materials." *Biosens Bioelectron* 2111: 2058-2063).

FIG. 1 is a schematic of a prior art experimental setup showing coplanar electrodes straddling the marine sediment-seawater interface. Due to distinct differences in chemical composition of the seawater and sediment established by microbial decomposition of organic matter, an open circuit voltage of approximately 0.7 V is observed between the electrodes. According to Reimers et al., Harvesting Energy from the Marine Sediment-Water Interface, Environ. Sci. Technol. 2001, 35, 192-195, the working model for observed power generation involves net oxidation of sediment organic matter by dissolved seawater oxygen, catalyzed by sediment microbes and mediated by one or more secondary electron-transfer mediators. Separation of reactants, necessary to isolate electrode half reactions and allow flow of electrons through the external circuit, is maintained by microbial oxygen depletion in the top layer of sediment.

The anode, which is buried in anoxic sediments, and the cathode, which is suspended in the overlying aerobic water, are both exposed to the environment. There is no need to enclose the anode in a chamber to promote anaerobic conditions at the anode, or to incorporate ion-selective membranes to limit diffusion of oxygen toward the anode, as there is in many other microbial fuel cell applications. This is because the anoxic sediment naturally provides anaerobic conditions at the anode surface. The sediment microbial fuel cell is a static system, eliminating the energy inputs associated with pumping and stirring in many other microbial fuel cell designs. Thus, although the current outputs of sediment fuel cells are low, there is a net energy output sufficient to power electronic monitoring devices (Tender, L. M., S. M. Gray, et al. (2008). "The first demonstration of a microbial fuel cell as a viable power supply: powering a meteorological buoy." *J. Power Sources* 179: 571-575). In contrast, most laboratory scale microbial fuel cells serving as prototypes for other microbial fuel cell applications have designs that will consume more energy in long-term application then they produce.

The potential that sediment microbial fuel cells may serve as a long-term power source, extracting energy from a constantly renewing source of organic matter in sediments is very attractive. However, a limitation of sediment microbial fuel cells is the necessity to anchor the anode in anoxic sediments. Microbial fuel cells in which the anode could function in aerobic water would expand the range of aquatic locations in which microbial fuel cells might be used to power electronic devices (Ringeisen, B. R., R. Ray, et al. (2007). "A miniature microbial fuel cell operating with an aerobic anode chamber" *Journal of Power Sources* 165(2): 591-597), Such 'aerobic microbial fuel cells' might have the advantage over traditional batteries in lower costs of materials and presenting a lower explosion hazard during transportation prior to deployment.

Biologically active films (also referred to as "biofilms") growing on stainless steel anodes were able to produce current in aerobic seawater that was nearly one-third that of a similar anaerobic system (Erable, B. and A. Bergel (2009). "First air-tolerant effective stainless steel microbial anode obtained from a natural marine biofilm." *Bioresource Technology* 10(13): 3302-3307). However, the system was not a true microbial fuel cell because the anode was electronically poised at a negative potential, thus net power was not produced. Furthermore, electronically poising the anode could potentially provide electrons to promote removal of oxygen within the biofilm. Current-producing biofilms were not produced if the anode was not electronically poised (Erable and Bergel 2009)

A laboratory microbial fuel cell inoculated with the facultative anaerobe, *Shewanella oneidensis*, continued to produce power when dissolved oxygen was purposely introduced into the anode chamber (Ringeisen, Ray et al. 2007). In this system a relatively large culture reservoir was maintained under aerobic conditions and continuously cycled through a small anode chamber. Current was produced (6.5 mW/m$^2$ and 13 mA/m$^2$) from a lactate fuel source, despite the presence of oxygen in the anode chamber. Cells did not appreciably attach to the anode and electron transfer between *S. oneidensis* and the anode was thought to be proceed via electron shuttles (Ringeisen, Ray et al. 2007) which *Shewanella* species have previously been shown to excrete (Nevin, K. P. and D. R. Lovley (2002). "Mechanisms for Fe(III) oxide reduction in sedimentary environments." *Geomicrobiol. J.* 19: 141-159; Marsili, E., D. B. Baron, et al. (2008). "*Shewanella* secretes flavins that mediate extracellular electron transfer." *PNAS* 105: 3968-3973; von Canstein, H., J. Ogawa, et al. (2008).

"Secretion of flavins by *Shewanella* species and their role in extracellular electron transfer." *Appl Environ Microbiol* 74: 615-623).

However, the previously described *Shewanella*-based system would not be directly applicable to powering electronics in aerobic water. It was a complex system requiring continuous pumping to recirculate the anolyte between the anode and the large anolyte reservoir. Therefore, it is likely that the power consumption of the system far exceeds the power output at the anode. Instead of reducing oxygen as the electron acceptor, the catholyte was ferric cynanide, which is a non-renewable, toxic electron acceptor that would not be suitable for long-term field deployments. Columbic efficiencies were low (<6%), when calculated based on the incomplete oxidation of lactate to acetate. The accumulation of two-thirds of the electrons available in lactate in the waste product acetate, meant that the overall efficiency of conversion of fuel to current was even lower.

There are organisms, such as *Geobacter* species, that can effectively oxidize acetate with electron transfer to electrodes (Bond, D. R., D. E. Holmes, L. M. Tender, and D. R. Lovley. (2002). "Electrode-reducing microorganisms that harvest energy from marine sediments". Science 295:483-485; Bond, D. R. and D. R. Lovley (2003). "Electricity production by *Geobacter sulfurreducens* attached to electrodes." *Appl. Environ. Microbiol.* 69: 1548-1555). For example, *Geobacter sulfurreducens* converts acetate to current with columbic efficiencies of over 90% (Nevin, K. P., H. Richter, et al. (2008). "Power output and columbic efficiencies from biofilms of *Geobacter sulfurreducens* comparable to mixed community microbial fuel cells." *Environ. Microbiol.* 10: 2505-2514; Yi, H., K. P. Nevin, et al. (2009). "Selection of a variant of *Geobacter sulfurreducens* with enhanced capacity for current production in microbial fuel cells." *Biosenors Bioelctron*.: (submitted)). Although *G. sulfurreducens* is considered to be an anaerobe, it is capable of withstanding low levels of oxygen and under these conditions may use oxygen as an electron acceptor to support growth (Lin, W. C., M. V. Coppi, et al. (2004). "Geobacter sulfurreducens can grow with oxygen as a terminal electron acceptor." *Appl Environ Microbiol* 70: 2525-8; Leang, C., W. C. Lin, et al. (2010). "Role of cytochrome bd ubiquinol oxidase in scavenging oxygen during low levels of oxygen exposure in Geobacter sulfurreducens." (submitted))

Traditional microbial fuel cells are two chambered with an anaerobic anode and an aerobic cathode. This design presents numerous engineering problems. Anodes and cathodes must be close to each other in order to facilitate proton transfer and increase power outputs, and proton exchange membranes themselves have limitations. The cathode cannot be anaerobic, as oxygen is needed at the cathode surface to complete the reaction with the electrons and protons. The anodes cannot be aerobic as the bacteria that are capable of producing current do so under anaerobic conditions. Even if a facultative organism or oxygen tolerant anaerobe is used in a system with an oxygen leak, the efficiency of the conversion of fuel to electricity goes down as the organism uses up the oxygen to make an anaerobic environment for itself (Rosenbaum, M., F. Aulenta, et al. (2010). "Cathodes as electron donors for microbial metabolism: which extracellular electron transfer mechanisms are involved?" *Bioresource Technology* doi: 10.1016/j.biortech.2010.07.008).

Proton exchange membranes have been removed in some one chamber microbial fuel cells. However in these cases, the anode is anaerobic and the cathode is aerobic and they are separated by enough space to allow for a gradient of oxygen. Generally, these systems require pumping of liquid from anode to cathode and sparging with air before the liquid reaches the cathode (to allow for the oxygen reaction) or other engineering to allow for the removal the membrane, both of which increase the cost of operating such a system and make the overall system more complicated (Bi, W., Q. Sun, et al. (2009). "The effect of humidity and oxygen partial pressure on degradation of Pt/C catalyst in PEM fuel cell" *Electrochimica Acta* 54: 1826-1833; Lee, W. J. and D. H. Park (2009). "Electrochemical activiation of nitrate reduction to nitrogen by *Ochrobactrum* sp. G3-1 using a noncompartmented electrochemical bioreactor." *J. Microbio. Biotechnol.* 19: 836-844).

If the membrane could be removed and the anode of a microbial fuel cell made functional in an aerobic environment, the applications of microbial fuel cells could be greatly expanded.

Electrode based microbial fuel cell systems have been widely studied. Some publications that discuss such systems include:

D R Lovley. Microbial fuel cells: novel microbial physiologies and engineering approaches, Current Opinion in Biotechnology Volume 17, Issue 3, June 2006, Pages 327-332; DR Lovley. Bug juice: harvesting electricity with microorganisms, Nature Reviews Microbiology 4, 497-508 (July 2006); D. R. Lovley. The microbe electric: conversion of organic matter to electricity, Current Opinion in Biotechnology Volume 19, Issue 6, December 2008, Pages 564-571; B. E. Logan, B. Hamelers, R. Rozendal, U. Schroder, J. Keller, S. Freguia, P. Aelterman, W. Verstraete, and K. Rabaey, Microbial Fuel Cells: Methodology and Technology Environ. Sci. Technol., 2006, 40 (17), pp 5181-5192; and Microbial Fuel Cells, Bruce E. Logan ISBN: 978-0-470-23948-3 Jan. 2008, Wiley.

Microbial fuel cells are primarily run as systems having two chambers to separate the anaerobic anode from the aerobic cathode. In some cases the systems are single-chambered. In these instances the anode is anaerobic and the cathode is usually an air cathode on the outside of the vessel. A paper that describes such a system is Wang, X., Feng, Y. J. and Lee, H. (2008), "Electricity production from beer brewery wastewater using single chamber microbial fuel cell", *Water Science and Technology*, 57, 7: 1117-1121.

There is a need for systems and methods that provide single chamber aerobic fuel cells.

SUMMARY OF THE INVENTION

According to one aspect, the invention features an anode electrode for use in a fuel cell. The anode electrode comprises an electrode body comprising an electrode body, the anode electrode having at least one anode electrical terminal and having at least a conductive external surface, the electrode body having at least one cavity defined within the electrode body, the cavity configured to contain a fuel-bearing liquid, the electrode body configured to allow controlled leakage of the fuel-bearing liquid from the cavity to an external surface of the electrode body, the electrode body having defined therein at least one aperture configured to allow fuel-bearing liquid to enter the electrode body.

In one embodiment, the anode electrode is combined with a fuel cell housing configured to have situated therewithin the anode electrode and configured to have situated therewithin at least one cathode electrode; and at least one cathode electrode having at least one cathode electrode electrical terminal.

In another embodiment, the fuel cell housing lacks a semipermeable membrane between the anode and the cathode.

In yet another embodiment, the electrode body comprises graphite.

According to another aspect, the invention relates to a method of operating an aerobic microbial fuel cell. The method comprises the steps of providing an anode electrode comprising an electrode body, the anode electrode having at least one anode electrical terminal and having at least a conductive external surface, the electrode body having at least one cavity defined within the electrode body, the cavity configured to contain a fuel-bearing liquid, the electrode body configured to allow controlled leakage of the fuel-bearing liquid from the cavity to an external surface of the electrode body, the electrode body having defined therein at least one aperture configured to allow fuel-bearing liquid to enter the electrode body from a supply of fuel-bearing liquid; providing a cathode electrode having at least one cathode electrode electrical terminal; providing a biologically active film on the external surface of the anode electrode; providing a supply of fuel-bearing fluid in fluid communication with the at least one aperture configured to allow fuel-bearing liquid to enter the electrode body; providing a supply of oxidizer in a fluid external to the anode electrode; and connecting a load circuit external to the aerobic microbial fuel cell.

In one embodiment, the fuel-bearing fluid comprises acetate.

In another embodiment, the fuel-bearing fluid comprises an oxidizable substance.

In yet another embodiment, the method further comprises providing a fuel cell housing configured to have situated therewithin the anode electrode and configured to have situated therewithin at least one cathode electrode In still another embodiment, the fuel cell housing lacks a semi-permeable membrane between the anode and the cathode.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 3A is a model for the operation of an aerobic microbial fuel cell.

As illustrated in FIG. 3B, it is believed that oxygen provided by the environment is consumed at the outer surface of the biofilm to form water by biofilm microorganisms that oxidize acetate provided by material inside the anode.

As illustrated in FIG. 3C, it is believed that in the biofilm close to the anode acetate is oxidized to carbon dioxide with electron transfer through the biofilm to the anode.

FIG. 4A is a confocal laser scanning microscopy image of internally fed biofilms of *G. sulfurreducens* strain KN 400 after 5 days in aerobic media. The film was stained with using LIVE/DEAD BacLight stain and contained live cells.

FIG. 4B is a confocal laser scanning microscopy image of externally fed biofilms of *G. sulfurreducens* strain KN 400 after 2 days in aerobic media. The film was stained with using LIVE/DEAD BacLight Stain and contained dead cells.

DETAILED DESCRIPTION

Figure 1:
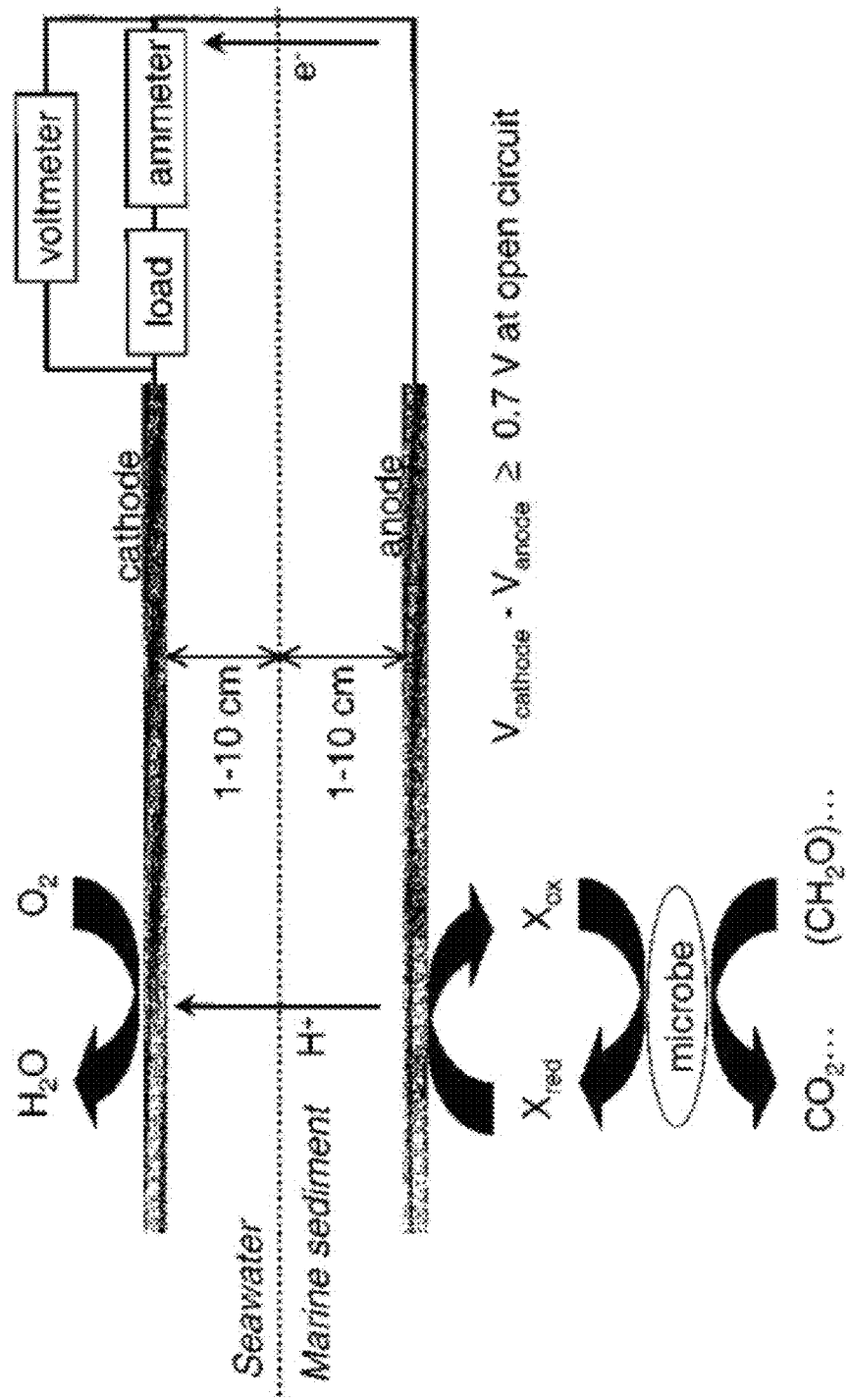
FIG. 1 is a schematic of a prior art experimental setup showing coplanar electrodes straddling marine sediment-seawater interface.

A sediment microbial fuel cell, as shown in FIG. 1, has an anode in the sediment and a cathode in overlying water. If the anode could be located in the water column, it would eliminate the need to tether the system to the bottom sediment. In another embodiment, an aerobic anode might allow for the engineering of fuel cells that could be deployed inside the human body or other living organisms. It is expected that in an alternative embodiment an aerobic anode can be used in microbial fuel cells that could power electronic equipment.

Figure 2A:
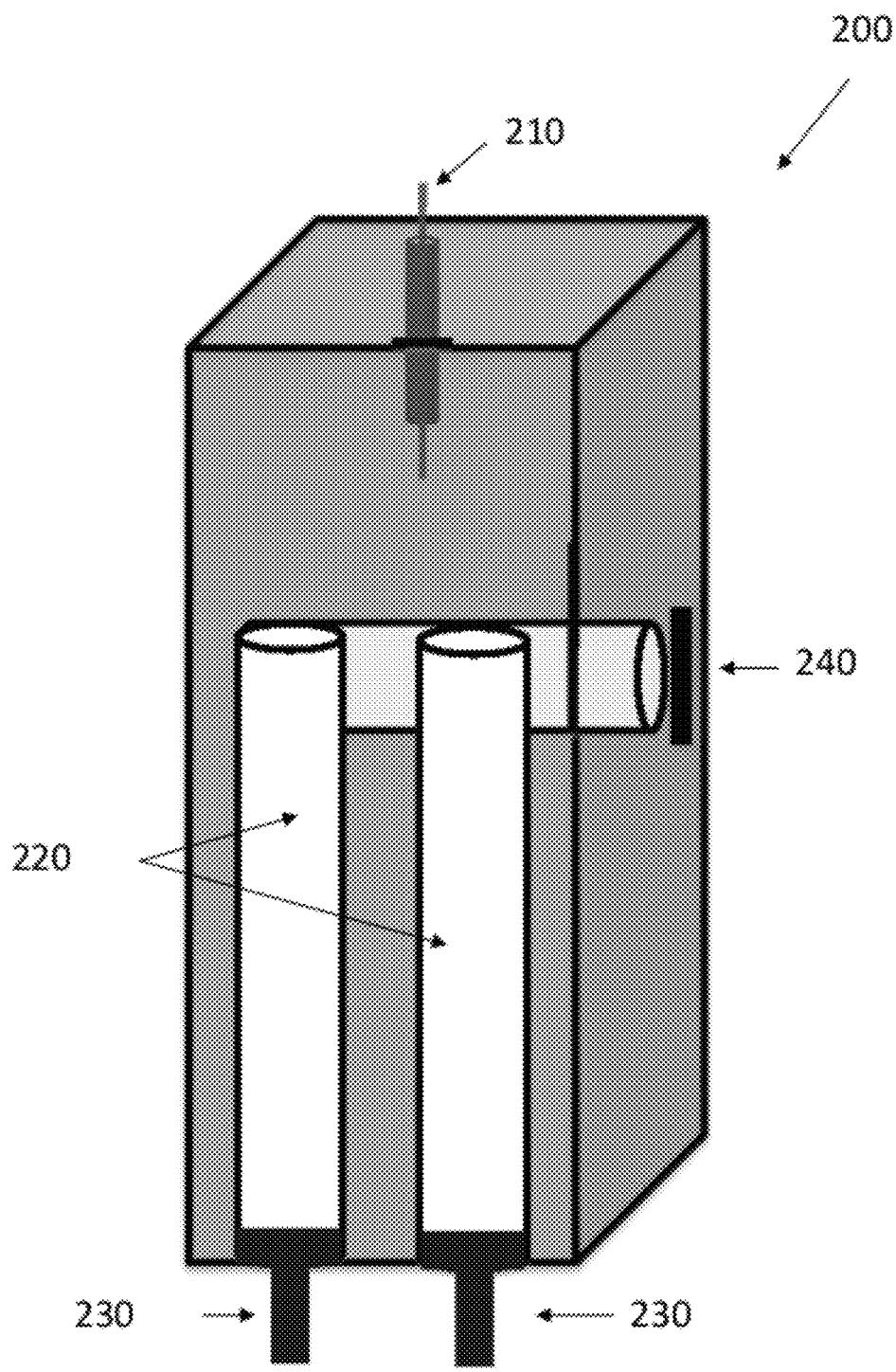
FIG. 2A is a diagram illustrating an internal chamber electrode having a rectangular design (7.62 cm height by 2.54 cm wide by 1.27 cm depth). The wire connection to the anode is at the top. The connections for acetate solution fill and circulation are at the bottom. A cap for the internal chamber is placed at the end of the cross-drilled internal tubulation.
Figure 2B:
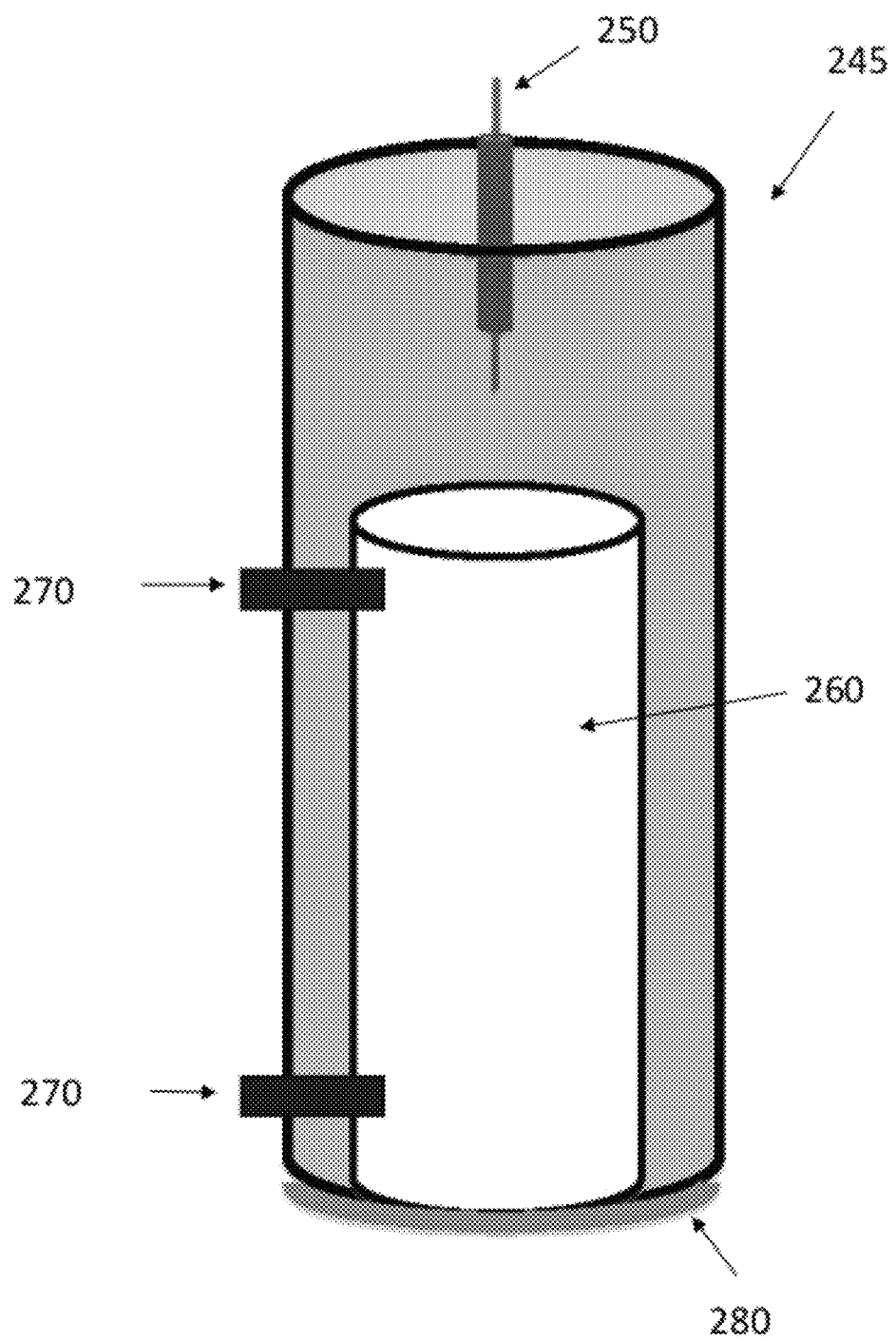
FIG. 2B is a diagram illustrating an internal chamber electrode having a cylindrical design (7.62 cm height by 2.54 cm diameter). The wire connection to the anode is at the top. The connections for acetate solution fill and circulation are at the side of the internal chamber. A cap for the internal chamber is placed at the bottom of the internal chamber.
Figure 2C:
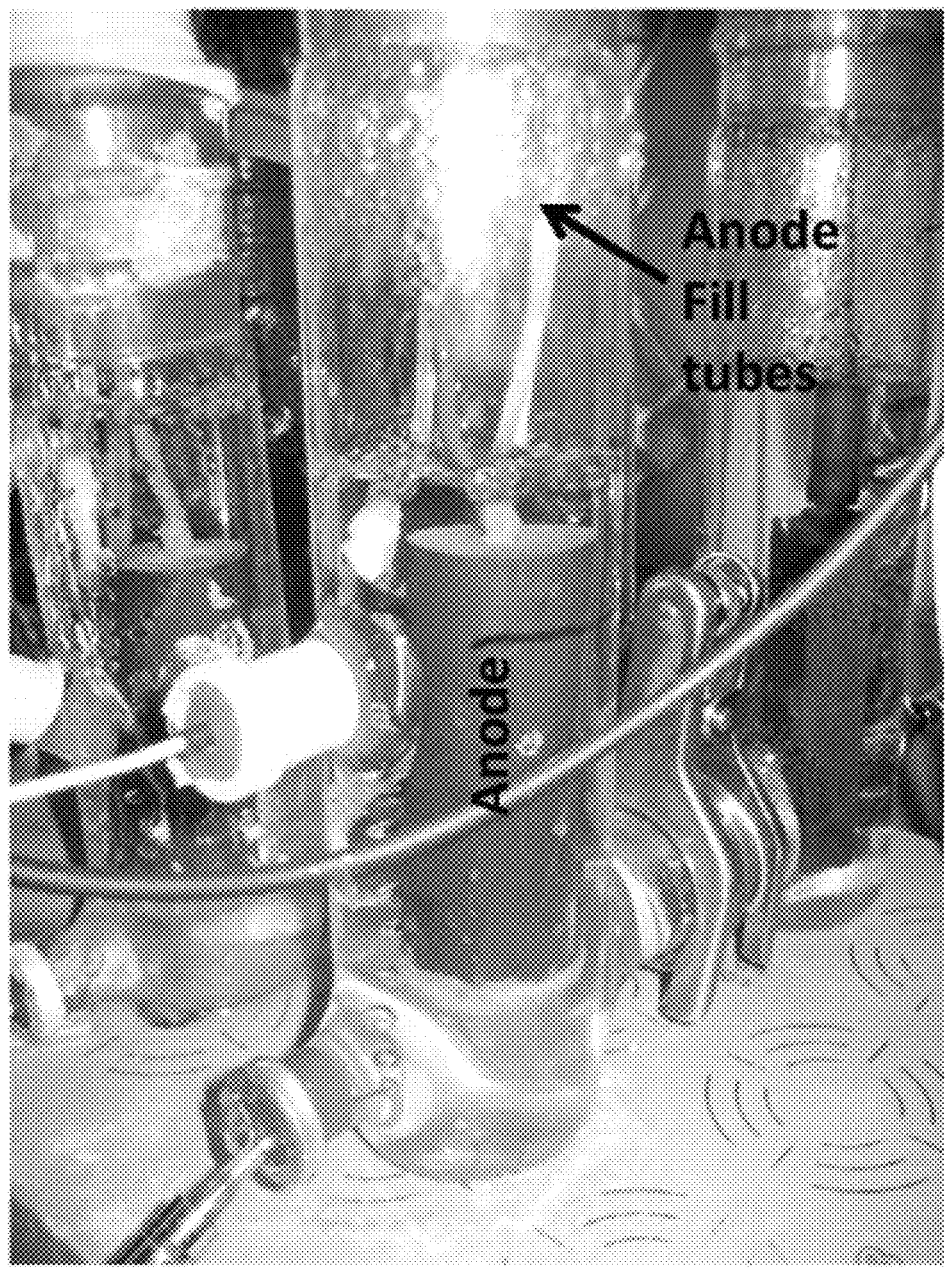
FIG. 2C is a diagram illustrating an operational set-up using an internal chamber electrode according to principles of the invention.

An anode which overcomes the previously described limitations and disadvantages was designed in which the fuel is provided from within a graphite anode body and diffuses out to the outer surface where the anode biofilm can oxidize it. Various embodiments of such anodes are shown in FIG. 2A, FIG. 2B and FIG. 2C. It is believed that the very outer-surface of the biofilm reduces oxygen and protects the bulk of the biofilm from oxygen exposure. In order to evaluate this anode design, a biofilm of *Geobacter sulfurreducens* strain KN400 (also referred to hereafter as "KN400") was first grown on the surface of a graphite electrode poised at −400 mV vs. Ag/AgCl, in a traditional two-chambered system with acetate as an external fuel source. After maximal current was reached, the acetate was removed from the external media and a concentrated acetate solution was pumped into a chamber defined inside the graphite anode. The current production of this anode remained steady, even though the acetate concentration in the external medium was zero. Furthermore, there was no drop in current or decrease in biofilm thickness when the cation-selective membrane separating the anode and cathode chamber was removed, exposing the anode chamber to dissolved oxygen. In contrast, systems in which acetate was provided in the external medium completely stopped producing current within 24 hours. Internally fed anodes colonized by a strain of KN400 adapted to grow at marine salinities produced current at levels as high as or higher than those observed in traditional two-chambered microbial fuel cells when they were placed in continuously aerated aquaria of seawater. These results dramatically increase the potential applications and the options for system designs of microbial fuels.

We have also devised a method of running a fuel cell in aerobic buffered fresh or salt water.

The invention provides a system for powering marine electronics with non-toxic, non-explosive fuels and components and a self-renewing catalyst.

The new system is single-chambered (e.g., both anode and cathode are present in the same phase and a semi-permeable membrane need not be situated between the anode and cathode). This system operates using a novel delivery system for the fuel for the anode. If the fuel is provided from the inside of the anode, current production is stable over a period of weeks. However, if the fuel is provided as it usually is, in the anode solution, the current production goes to zero in less than a day when the system is made aerobic.

These systems are stable over the period of weeks producing the maximum current for this configuration. The biofilms present on the anode surface are live as determined by live dead staining and confocal scanning laser microscopy. This technique has been used in both freshwater and marine buffered system with the same results.

We have demonstrated that single chamber fuel cells employing *Geobacter sulfurreducens* strain KN400 can be run in open aerobic systems, by providing the fuel for the bacteria from inside the anode itself. The advancement will greatly expand the possible applications of microbial fuel cells. The design is appropriate for use with apparatus in salt water or freshwater. This system could be used to replace traditional batteries in any aquatic setting. This invention can be used in many commercial uses.

Materials and Methods
Organism and Culture Conditions

*Geobacter sulfurreducens* strain KN400, hereinafter referred to as *G. sulfurreducens* strain KN400 or as KN400, was obtained from the laboratory culture collection. KN400 was routinely cultured in a freshwater anaerobic medium with acetate (10 mM) as electron donor and fumarate (40 mM) as electron acceptor.

In some cases the inoculum for the fuel cells was a marine adapted strain of KN400. This strain was generated in the same manner as described in Yi with the following differences. When the current in flow through reached 10 mA, the feed jug was replaced with one containing increasing salinity (by 20% increments of marine), when the current again reached 10 mA, the salt concentration was increased another 20% until the concentration of additional salts reached marine salinity (18 g/L NaCl, 5.4 g/L $MgCl_2*6H_2O$, 0.27 g/L $CaCl_2*2H_2O$). This marine adapted strain was poised at −400 mV vs. Ag/AgCl and cells from the biofilm were scraped off the anode with a sterile blunted needle and used to inoculate the marine experiments.

Anodes

Anodes were made of Grade G20 graphite blocks (Graphite Engineering and Sales, Greenville, Mich.). Rectangular anodes 200 as shown in FIG. 2A were 1 in. (2.54 cm) by 3 in. (7.62 cm) by 0.5 in. (1.27 cm). An electrical connector 210 was installed in the top of the anode body. In some cases, two evenly spaced holes 220 were drilled 2 inches into the 0.5 in by 1 in. side of the anode. These two holes were connected by cross drilling a hole 230 2 inches up the 0.5 in. by 3 in. side from the end of the anode in line with the 2 holes 220. The hole 230 in the side of the anode was sealed using epoxy and a 0.4 in. by 0.4 in. piece of glass coverslip 240. The resulting anode has a U shaped channel or cavity in it. Pharmed tubing and stainless steel threaded fittings were used to connect tubing to the anode. The tubing was run out of the anode chamber of the H-cell through one of the stoppers.

Cylindrical anodes 245 as shown in FIG. 2B were 3 inches high by 1 inch in external diameter (7.62 cm height by 2.54 cm diameter). An electrical connector 250 was installed in the top of the anode body. A central blind 2.5 inch deep drill hole 260 was bored from one end of the cylinder. Two access holes 270 were drilled radially to intersect the blind drill hole. The hole in the end of the anode was sealed using epoxy and a piece of glass coverslip 280 approximately 1 inch in diameter. The resulting cylindrical anode has an internal path or cavity through which solution can be circulated. Pharmed tubing and stainless steel threaded fittings were used to connect tubing to the anode. The tubing was run out of the anode chamber of the H-cell through one of the stoppers. It is believed that an anode having any convenient external shape (or cross section) other than square cross section or cylindrical cross section should also work as do rectangular anode 200 and cylindrical anode 245.

FIG. 2C is a diagram illustrating an operational set-up using an internal chamber cylindrical electrode. In FIG. 2C the anode and anode fill tubes are identified. The cylindrical anode is situated within a laboratory reaction chamber having a shape similar to the letter "H." The cathode can be seen at the rear of the set-up in the second arm of the "H." In this laboratory configuration, access to the interior of the H cell is provided by way of perforations in the rubber stoppers sealing the various cell apertures.

Anode Operation Model

FIG. 3A is a model for the operation of an aerobic microbial fuel cell. The wire connection 302 is shown at the top of the anode. Two side connections 304 are illustrated for use in circulating acetate solution fill through a cavity 306 defined in the anode body. The cap 308 for the internal chamber is seen at the bottom of the anode body. Bacterial cells are indicated as ovals on one side of the anode.

Pregrowth in H-Type Poised Systems

*G. sulfurreducens* strain KN400 was inoculated 10% into an H-type fuel cell described in Bond, D. R. and D. R. Lovley (2003) "Electricity production by *Geobacter sulfurreducens* attached to electrodes" *Appl. Environ. Microbiol.* 69: 1548-1555 (hereinafter "Bond 2003"), with 40 mM fumarate and 10 mM acetate added. Biofims of KN400 were pregrown on anodes in H-type, two-chambered devices, in which the anode and cathode chambers are separated with a Nafion, cation-selective (or semi-permeable) membrane. The solid block graphite anodes that are typically employed were replaced with anodes with an interior chamber as shown in FIG. 2A and FIG. 2B. Anodes were poised at −400 versus Ag/AgCl with a potentiostat. Growth to an optical density at 600 nm, $A_{600\ nm}$, of 0.2 was followed by swapping the anode media to basal media with acetate as the electron donor and no soluble electron acceptor. Thus there was no electron acceptor other than the anode. Salt adapted *G. sulfurreducens* strain KN400 scraped from the starter cell, as described above, was directly inoculated into an H-type fuel cell containing marine media with 10 mM acetate added. In both cases the anodes were placed in flow through mode at 0.5 mL/min. Controls were the same configuration, except with solid block anodes and acetate remained in external media through the experiment.

When current production began fresh medium was continuously added to the anode chamber. Biofilms were grown until a current of 10 mA was achieved in the poised system. The medium input to the anode chamber was then changed to one in which the acetate was excluded and the internal chamber of the anode was filled with a concentrated (5 M) acetate solution. Current remained steady even though acetate became undetectable (<10 μM) in the external medium throughout the experiment.

Aerobic Experiments

Figure 6:
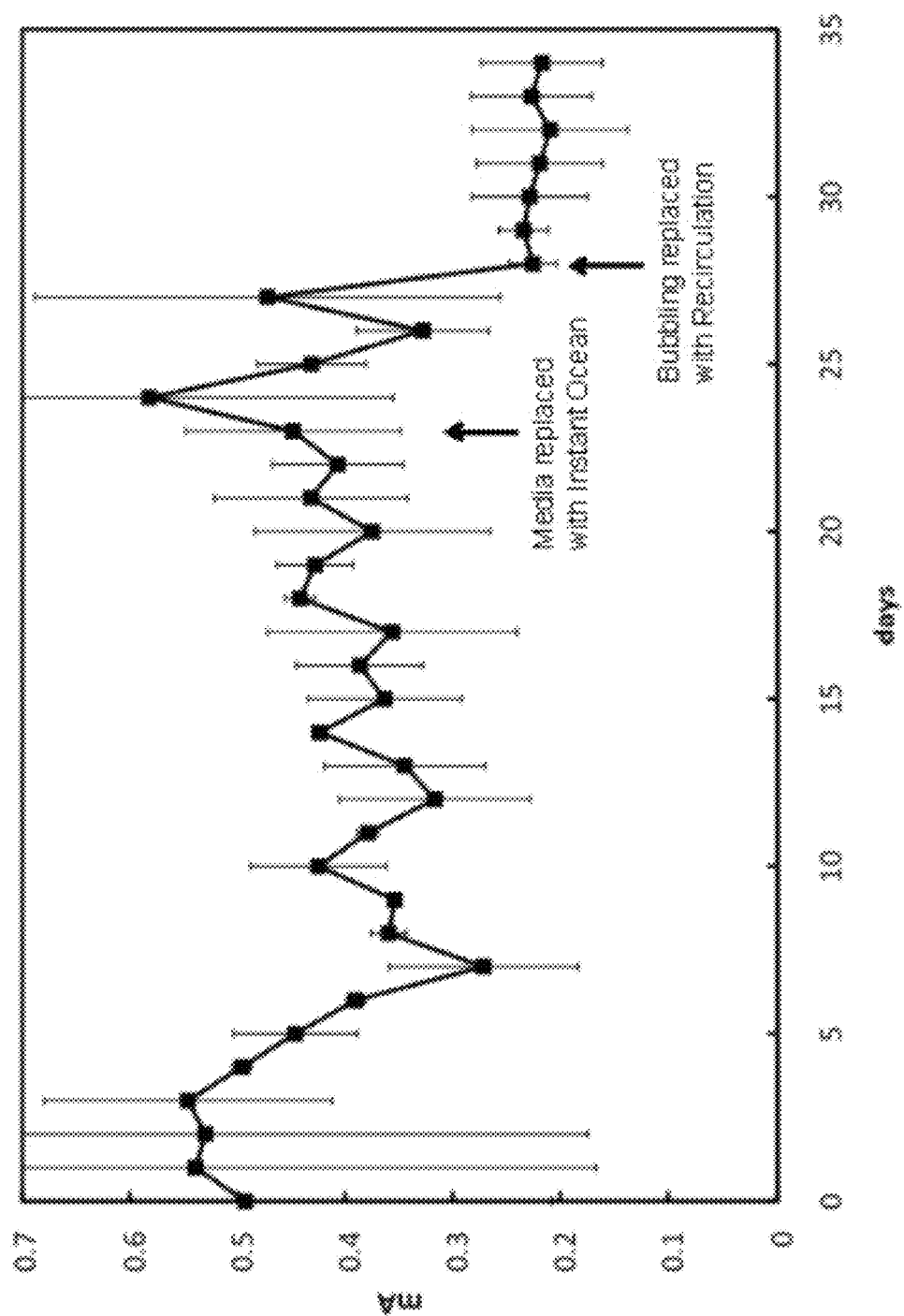
FIG. 6 is a graph showing the current average of 2 internally fed aerobic fuel cells of marine adapted *G. sulfurreducens* strain KN400. Error bars are used to indicate the range of data observed.

Anodes with U-shaped interior holes were monitored with HPLC to check that exterior acetate concentration was zero. In one experiment, the cation selective membrane (Nafion 117) was removed from the H-type cell, media replaced with the aerobic media FW (with tris replacing Sodium bicarbonate), bubbled with air, connected across a 560 ohm resistor and current output monitored. In other experiments, the anodes was removed from the H-cell and placed in an open aerobic 1 liter beaker containing 0.5 liters of marine media or a 10 gallon fish tank containing 20 Liters of either marine media or simulated seawater, connected across a 560 ohm resistor as a load, and the current output was monitored. The use of a fish tank was intended to simulate the operation of the anode of the invention in a natural environment, such as an outdoor environment, where neither a fuel cell housing nor a semi-permeable membrane situated between the anode and the cathode are present. As illustrated schematically in FIG. 8, in one embodiment of the 20 L system, the anode 802 and cathode 804 were shielded from each other with a 22% perforated sheet 806, which is not a semi-permeable membrane, but rather a fully permeable membrane, because the holes are large enough that any chemical species can pass therethrough (or around the perforated sheet 806 entirely). In the fish tanks, carbon fiber brushes (Panex 33 fibers, 1 OD by 5" bristles, double spiral, Gordon Brush, Commerce, Calif.), stainless steel brushes (570225 Stainless, double spiral, Gordon Brush, Commerce, Calif.) or solid graphite blocks (the same material as the anodes) were used as cathodes. In another embodiment, the anodes were placed within a perforated pipe and connected to an array of 8 stainless steel brushes (2.54 cm dia. by 25.4 cm overall length with 12.7 cm bristle fill) that functioned as cathodes. The medium was continuous bubbled with air. After about 22 days the marine medium was exchanged with artificial seawater (Instant Ocean, United Pet Group, Inc. Cincinnati, Ohio) as shown in FIG. 6.

Once acetate was no longer detectable in the anode chamber of systems with an internally fed anode, the systems were switched to fuel cell mode. The bicarbonate-buffered medium in the cathode chamber was replaced with medium that had the same components, but with Tris buffer (22 mM) substituted for the bicarbonate and the cathode chamber was bubbled with air. The use of Tris buffered-medium was required because the bicarbonate-buffered medium reached an unacceptably high pH (>9) when bubbled with air. The potentiostat was disconnected and a direct connection was made between the anode and the cathode across a 560 ohm resistor. When the anode chamber was maintained under anaerobic conditions the current output of these fuel cells was ca. 0.35 mA.

Other Analyses

Acetate and other organic acids were determined via HPLC with an Aminex HPX-87H column (Biorad, Hercules, Calif.) with an eluent of 8 mM H2SO4 and UV detection at 210 nm. Confocal microscopy was performed on biofilm samples using LIVE/DEAD BacLight Stain. Oxygen was monitored with a DO meter (YSI model 550A, Yellow Springs, Ohio).

Examples and Results

Figure 10:
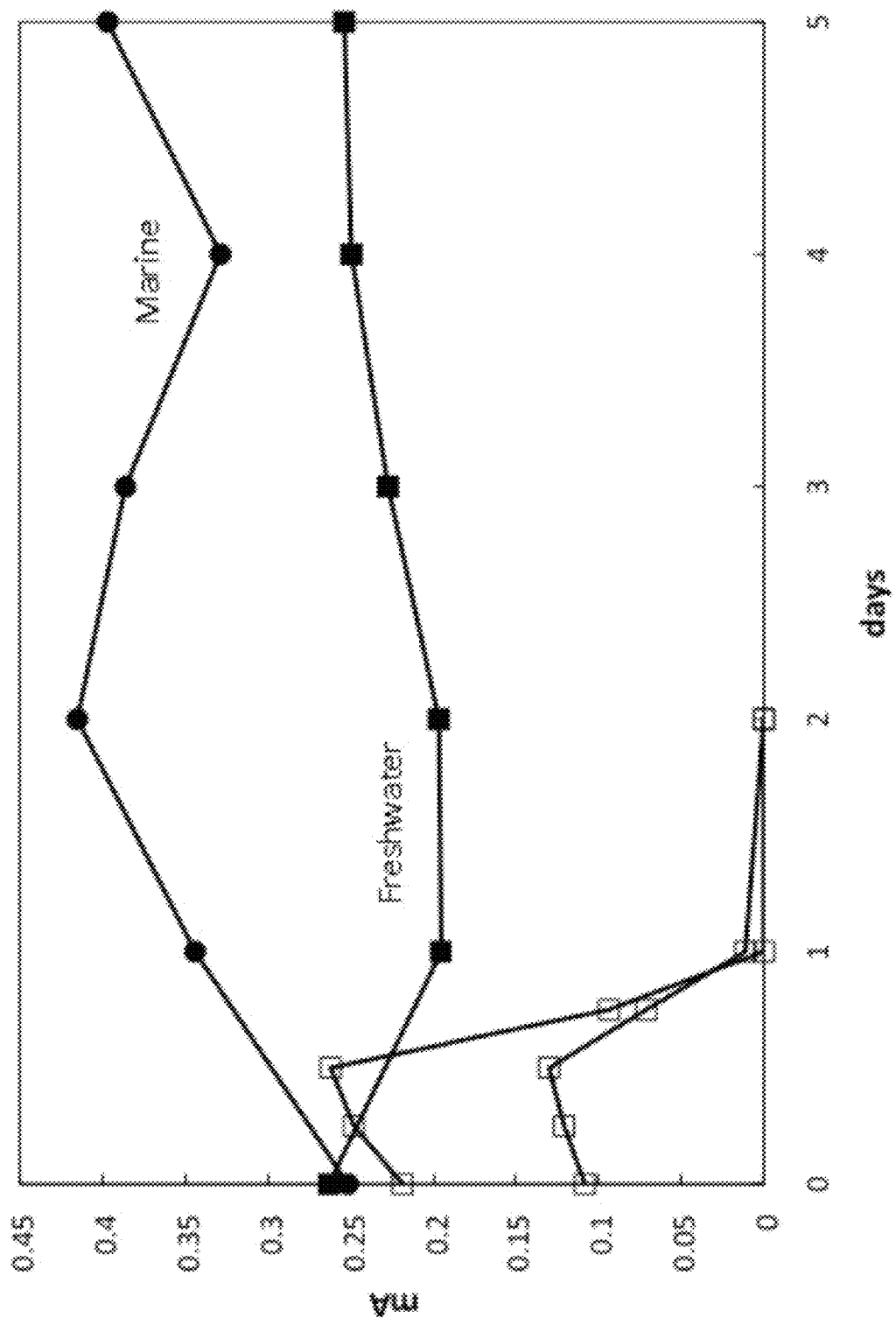
FIG. 10 is a graph showing current production versus time for *G. sulfurreducens* strain KN 400 films pre-grown as internally fed −400 mV H-cells and operated in membrane-less aerobic H-type fuel cells. Filled symbols represent data for internally fed operation. Open symbols represent data for observed current with added acetate in the external media.
Figure 11:
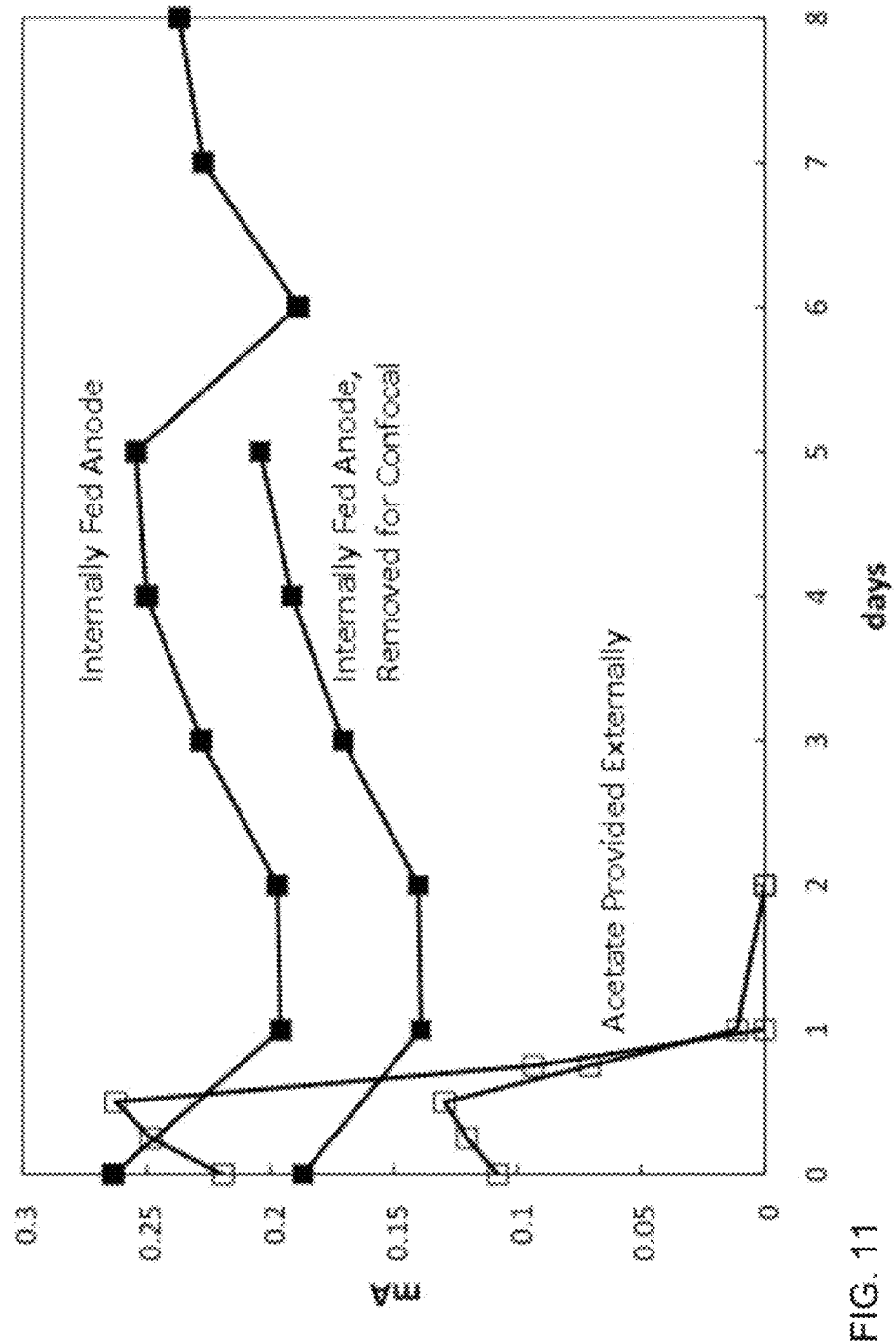
FIG. 11 is a graph showing the generation of current as a function of time for *G. sulfurreducens* strain KN 400 in membrane-less aerobic H-type fuel cells. Filled squares represent observed current data for internally fed anodes. Open squares represent data for observed current with added acetate in the external media. The biofilm was pre-grown as internally fed −400 mV H-cells.
Figure 12:
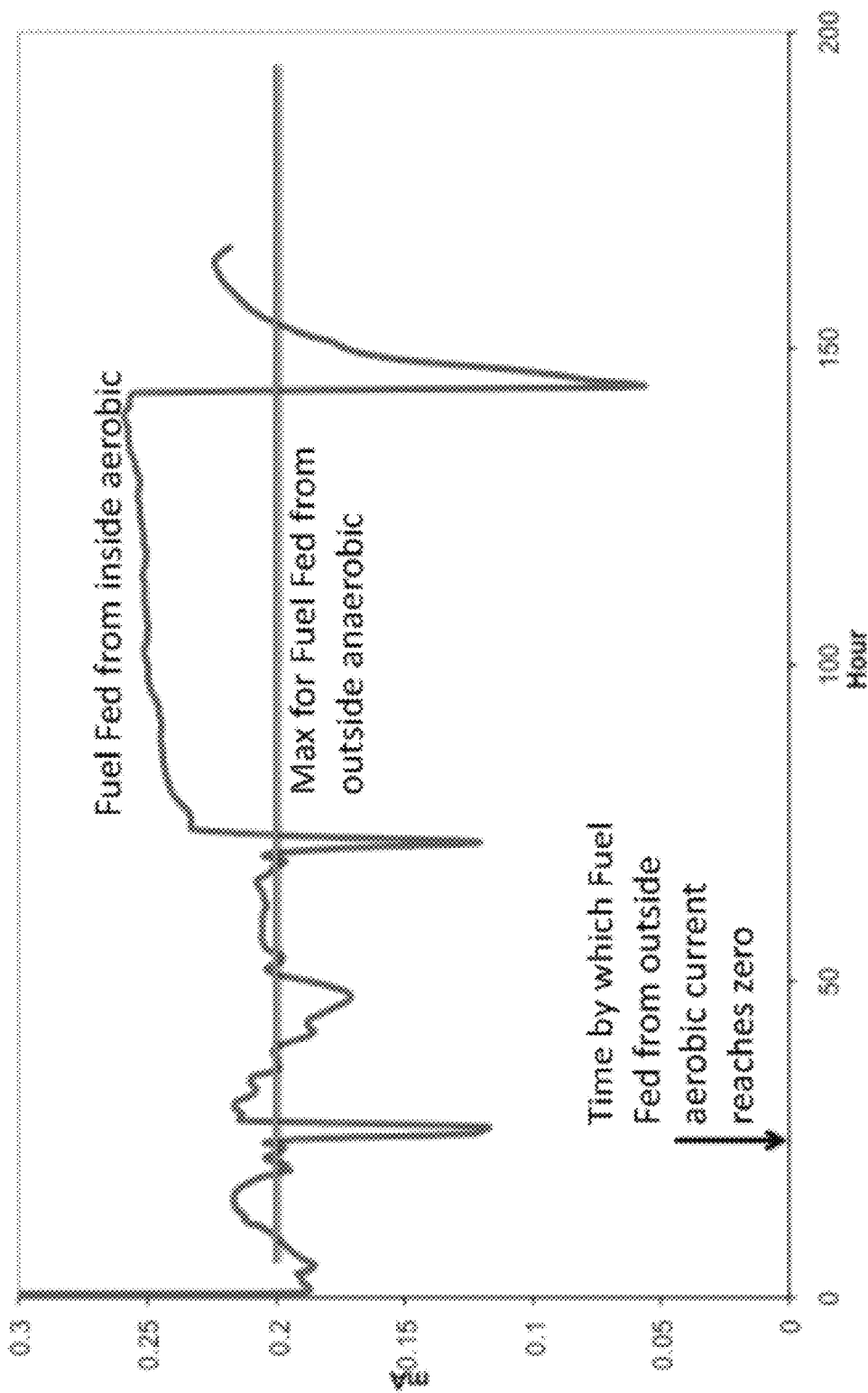
FIG. 12 is a graph showing the current production in a single-chambered fuel cell with *G. sulfurreducens* fed acetate from the inside of the anode is indicated by the time-varying line. The straight line at 0.2 mA indicates maximum current production in the same chamber, run as a two-chambered traditional fuel cell with a semi-permeable membrane. The arrow denotes the time at which the current reaches zero for a one-chambered system where *G. sulfurreducens* is fed from outside (that is, from the media).
Figure 13:
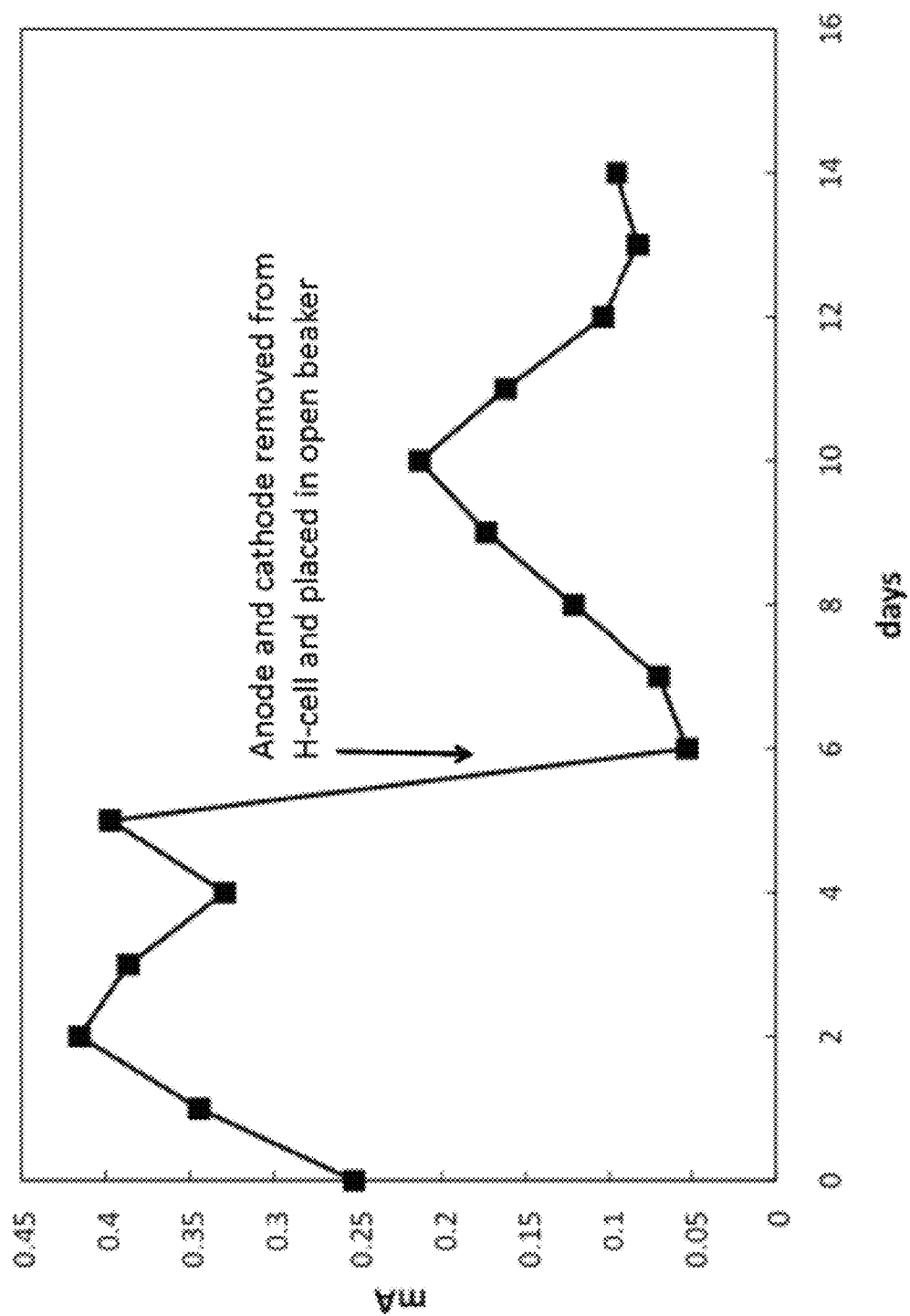
FIG. 13 is a diagram showing the current generation as a function of time for an internally fed marine adapted biofilm of *G. sulfurreducens* strain KN400 in an H-cell aerobic fuel cell and in a 1 liter beaker. The biofilm was pre-grown in internally fed −400 mV H-cells.
Figure 14:
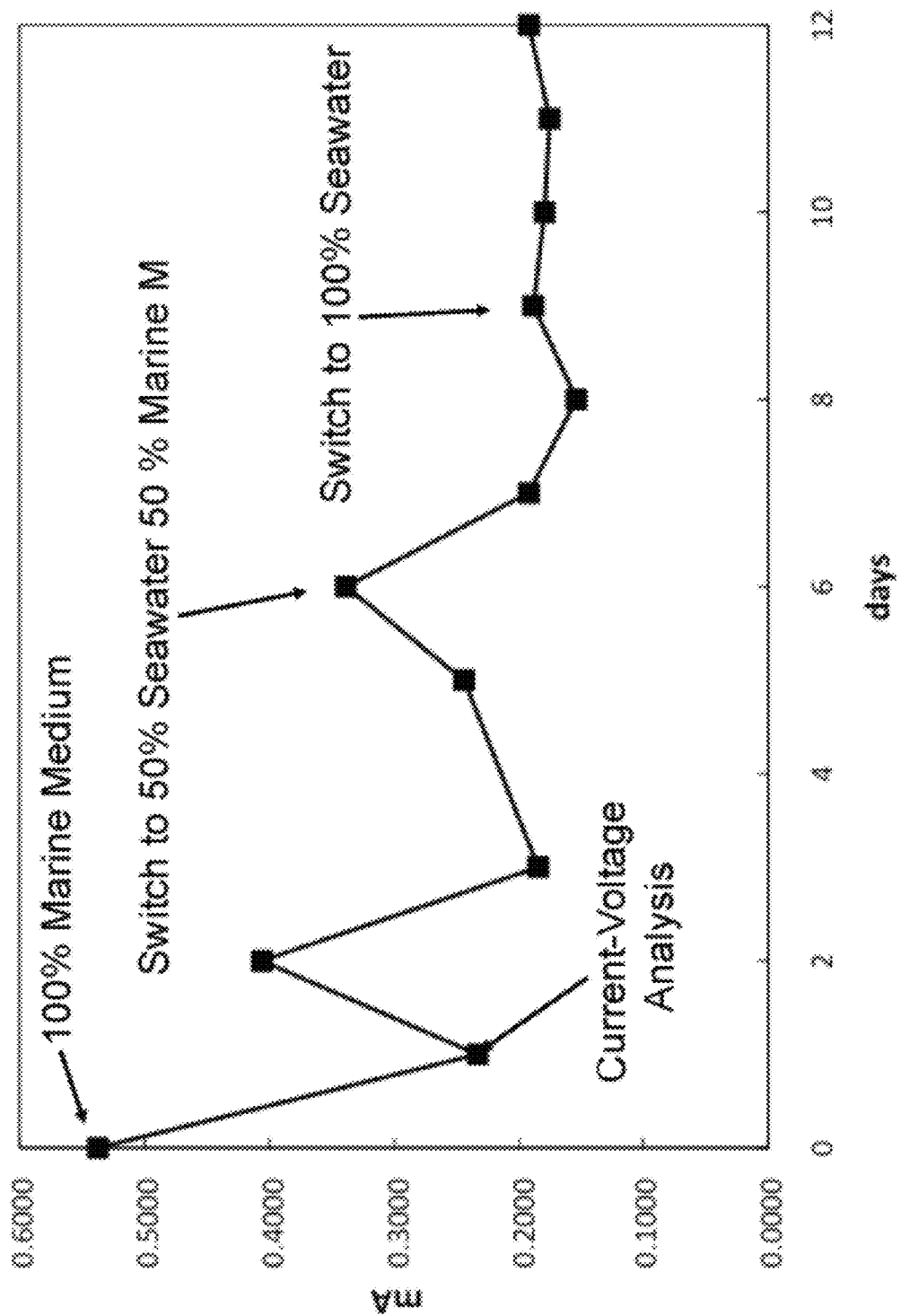
FIG. 14 is a diagram showing the current generation as a function of time for an internally fed marine adapted biofilm of *G. sulfurreducens* strain KN400 in a 20 L tank. The biofilm was pre-grown in internally fed −400 mV H-cells. The time points when the media were changed are indicated.

*G. sulfurreducens* strain KN400 was used as a biofilm in a fuel cell with media containing Tris as buffer. Controls contained acetate in the external media, whereas experimental anodes were fed from the inside with a concentrated acetate solution. The current output of this fuel cell connected across a 560 ohm resistor was 0.25 mA (FIG. 10), which is comparable to two-chambered H-cells. The single chambered aerobic system, which had acetate fed from inside the anode itself, had steady current production over the 7 days that the experiment was run. The single chambered aerobic system, which had acetate in the external media the current dropped from the original value of 0.25 mA to zero in 24 hours (FIG. 10). The acetate concentration in the external media of the internally fed anode was substantially zero. When the internally fed electrode was removed and examined with scanning laser confocal microscopy, the biofilm stained entirely live (FIG. 4A) indicating that the internally fed biofilm was not adversely affected by the presence of oxygen in the external media. The biofilm had similar topology to biofilms in anaerobically grown and run fuel cells.

As shown in FIG. 4A, all of the cells stained green with Live/Dead stain, suggesting that the cells throughout the biofilm were metabolically active and that the presence of oxygen in the external medium did not adversely affect the biofilm.

In contrast, to the steady current production with the anode biofilm supplied acetate from within the anode, current production rapidly declined when acetate was provided externally, as shown in FIG. 10. The biofilm present on the anode was metabolically inactive after two days in the aerobic tank, as shown in FIG. 4B. It is believed that the death of the biofilm when both acetate and oxygen are provided in the external medium can be attributed to the high concentrations of both acetate and oxygen being available at the outer surface of the biofilm, resulting in high rates of metabolism and free radical formation. As the outer surface cells are killed due to oxidative stress, high acetate and oxygen will become available at successively lower levels of the biofilm, resulting in the eventual death of the entire biofilm. However, when acetate is provided from within the anode, acetate concentrations, and hence rates of metabolism, are expected to be highest deep within the biofilm, which remains anaerobic. Slower rates of metabolism at the outer surface, due to low acetate availability, may be sufficient to consume oxygen, without overproduction of radicals, reducing the level of oxidative stress. Furthermore, if the biofilms of *G. sulfurreducens* are electrically conductive, then electrons released into *G. sulfurreducens* biofilms primarily near the acetate source with internally fed anodes may be conducted not only to the anode, but also toward the outer surface of the biofilm where oxygen is available. This would provide a source of electrons for oxygen consumption without the metabolism-dependent production of free radicals by cells in the outer surface.

Figure 5:
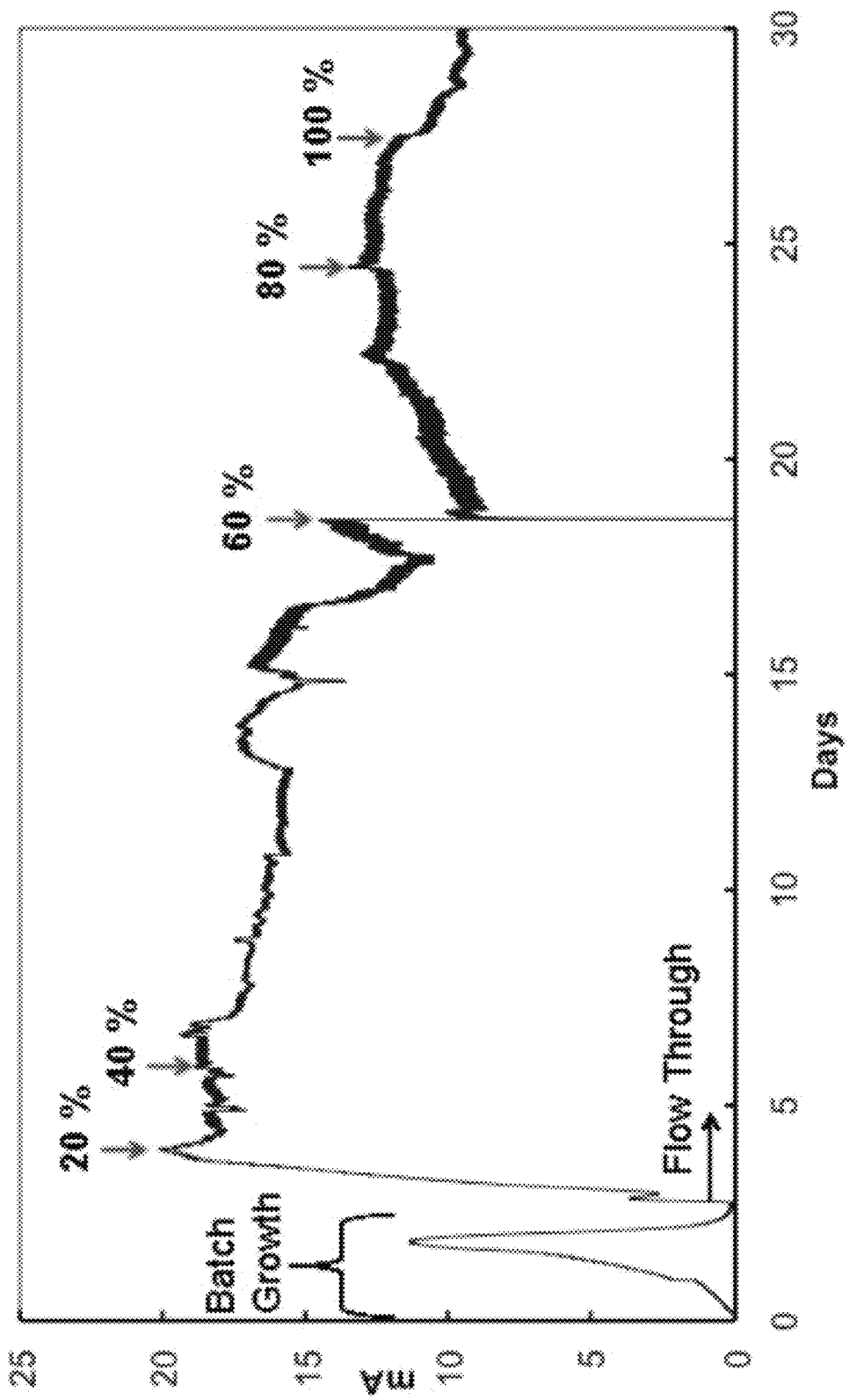
FIG. 5 is a graph showing the adaption trajectory of KN400 in an H-type cell poised at −400 mV versus Ag/AgCl to marine salinity.
Figure 7:
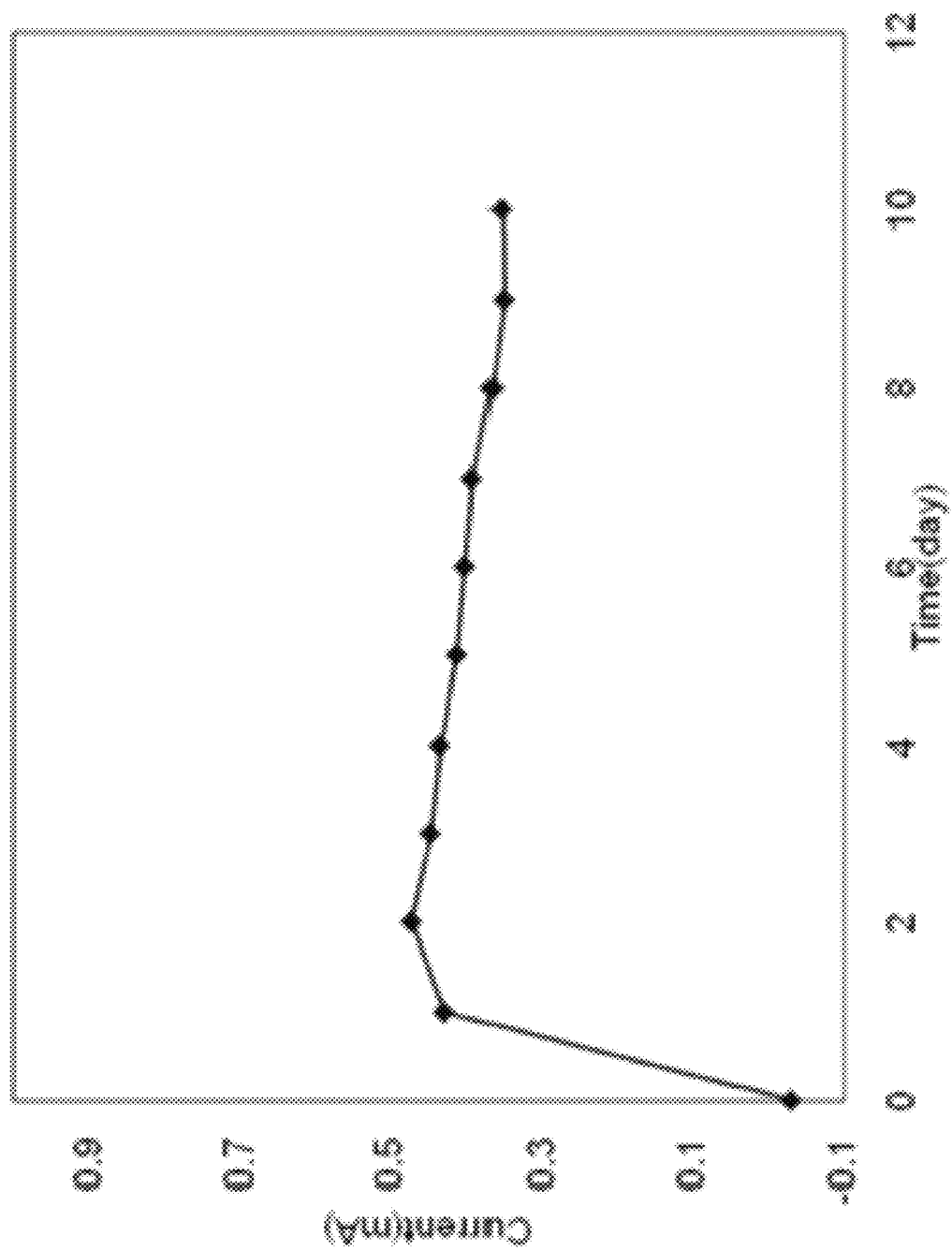
FIG. 7 is a graph showing the current production of potentiostat poised internally fed aerobic fuel cells of marine adapted *G. sulfurreducens* strain KN400.

A strain of KN400 adapted to grow at marine salinities also successfully produced current under aerobic conditions when acetate was provided from within the anode (FIG. 5). As in the freshwater strains, acetate appeared to be completely consumed within the anode biofilm because it was undetectable in the external medium. When the anodes were placed within a fish tank containing marine medium, they continued to produce current, as shown in FIG. 6. Current production continued when the marine medium was replaced with artificial seawater, as shown in FIG. 6. The concentration of dissolved oxygen in the tank was steady at slightly less than atmospheric concentration all locations in the tank. To determine whether the system was limiting the current production, a poised anode was used. The poised anode produced the same level of current as the fuel cell when connected across a resistor, as indicated in FIG. 7, suggesting that the level of current produced is likely to be the maximum for this type of configuration.

The marine adapted strain of *G. sulfurreducens* strain KN400 was internally fed in an H-cell from which the Nafion was removed. The current production was slightly higher than that of the freshwater strain (FIG. 10) After 5 days the anode was removed from the H-cell and placed in an open 1 liter beaker. Current production dropped in the open beaker, but the system did continue to produce current at about half the level it produced when the Nafion was removed.

Figure 8:
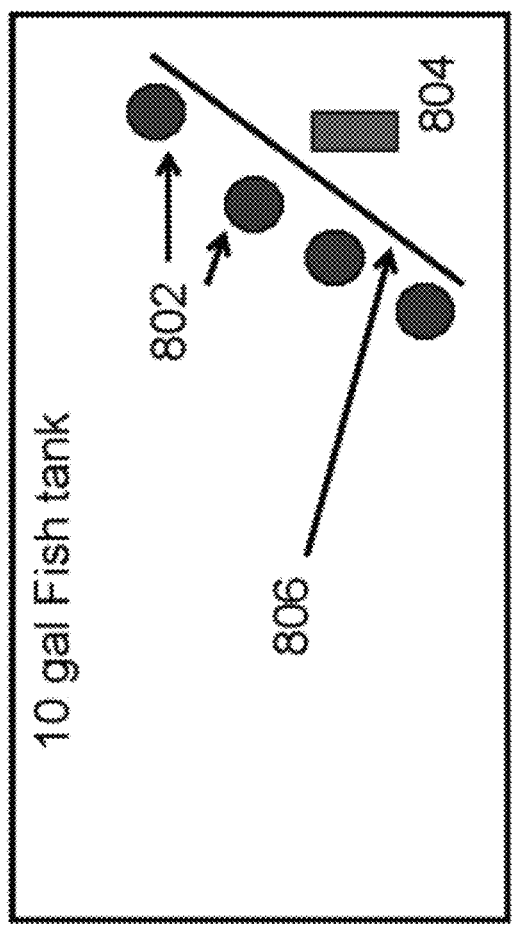
FIG. 8 is a schematic diagram illustrating the operational set-up in a 10 gallon fish tank.

The marine adapted strain of *G. sulfurreducens* strain KN400 was internally fed in a two chambered H-cell, then removed and placed in a fish tank with bottle brush cathodes (FIG. 8). The fuel cells continued to produce current for up to 3 weeks in a totally aerobic open tank. The level of current production depended on the cathode material, the best current production was seen in the brush cathodes (twice that of the blocks), which have greater surface area than the solid graphite blocks. When CV curves were performed on the open tank fuel cells, the curves were similar to those obtained in a two-chambered anaerobic/aerobic system (FIG. 5). This would indicate that the bacteria present on the anode are active and not adversely affected by the aerobic tank. The concentration of oxygen in the tank was steady at all locations in the tank, and was the expected value for the temperature of the experiment. Acetate was never detected in the seawater or media present in the tank. The internal feeding of the anode biofilm precludes the determination an efficiency because the concentration of acetate within the electrode is so high that acetate depletion can not readily be detected. Freeing the anode of the microbial fuel cells from an anaerobic environment greatly increases the potential applications of this type of system. Having the fuel (e.g., the electron donor) come out from the inside of the anode allows the bacteria present on the outside of the biofilm to oxidize the acetate diffusing out of the anode, thus protecting the bacteria on the inside of the biofilm from a large amount of oxygen stress. In this manner the outer biofilm is protecting the inner biofilm from the surrounding aerobic environment. It is observed that this protection only functions when the fuel is diffusing out of the anode itself, and not when the fuel is present in the surrounding media.

Internally feeding the anode bacteria has added benefits over other proposed strategies for feeding sediment fuel cells. The addition of complex organic matter to sediment surrounding the anode might not result in a direct increase in current as bacteria that are capable of using the breakdown products of complex organic matter degradation, such as acetate, might use the acetate before it has a chance to diffuse to the anode. Internal feeding excludes bacteria that are near to the electrode from utilizing/wasting the added fuel (electron donor) provided for current generation, by more directly feeding the bacteria attached to the anode surface. Additionally, internal feeding may have applications for other types of devices/systems, where fuel is being provided from a source, as the design of the fuel cell is simplified. This type of configuration would not be suitable for wastewater or other low concentration, large volume electron donor applications, but would be suitable for any application where the fuel was being provided.

Figure 9:
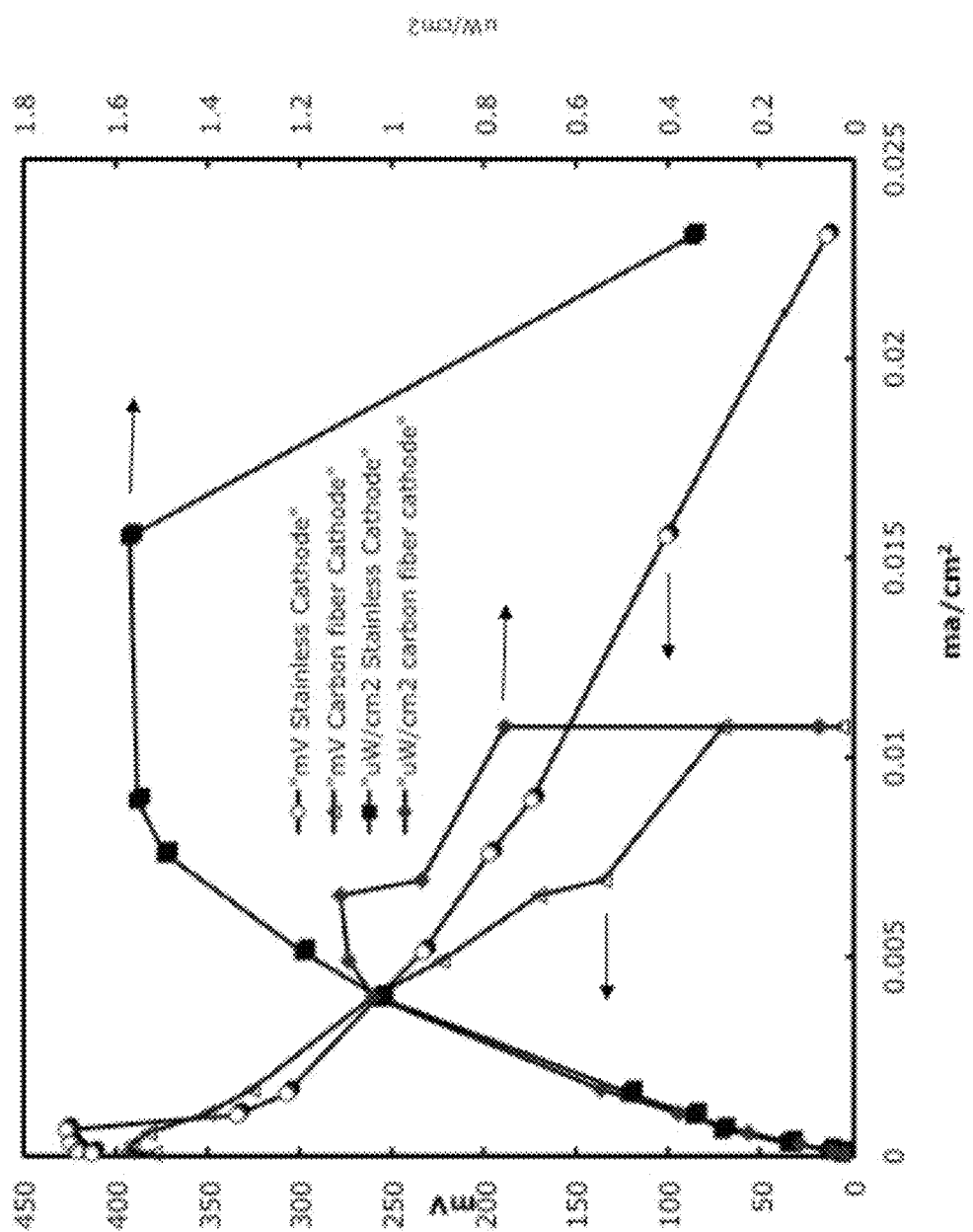
FIG. 9 is a graph showing current-voltage data obtained by operating the aerobic fuel cell of marine adapted *G. sulfurreducens* strain KN400 with internally fed anodes in fresh water held in the fish tank of FIG. 8, as a function of time. Both stainless steel and carbon cathodes were used.

When current-voltage studies were performed on the open tank fuel cells, the results were similar to those typically obtained in two-chambered anaerobic/aerobic systems (see FIG. 9). This provides further evidence that the aerobic conditions of the tank did not adversely affect the function of the biofilm.

The aerobic microbial fuel cell can operate for many days or months if a sufficient supply of fuel is provided. With the current design, it is calculated that the acetate fuel supply represented by 10 ml of a saturated solution of acetate will last for 750 days, assuming a 50% columbic efficiency of conversion of acetate to current.

In addition, one could consider that, for the same density of microbes per unit area, the current generated will be proportional to electrode area, while the fuel quantity will be proportional to the volume of the electrode cavity. In general, surface area goes as the square of dimensions, while volume goes as the cube of dimensions. By way of example, for a hypothetical spherical anode of radius R, the surface area is given by $4\pi R^2$, while the volume is given by $(4/3)\pi R^3$. If the radius were doubled, the volume to surface area ratio would go up by a factor of 2. A larger anode would therefore be expected to provide higher current (at the same density, for a larger area) but would offer the possibility of longer operation (based on a proportionally greater volume to surface ratio, and a proportionally larger fuel supply). There may be limits on how large an electrode one would want to use depending on the application. In addition, one could consider the possibility of recirculation of fuel from an outside source, which could raise the operating life by an undefined, but large, amount.

Thus, these results suggest that supplying anode biofilms with fuel from within the anode might offer a strategy for long-term current production with inexpensive non-toxic, non-explosive materials.

It is expected that other designs of anodes having cavities through which fuel solution can be flowed can be fabricated using less expensive materials and methods. For example, an anode fabricated using a glass or plastic frit or porous material, coated on its external surface with a conductive layer such as a deposited metal or a deposited graphite material (possibly even graphene) and provided with an electrical connector and a flow path for the fuel-bearing solution can be expected to provide a controlled outward leakage of fuel, similar to the graphite electrodes described hereinabove. An alternative more robust construction can be envisioned using a porous metal block in place of the graphite block. Porous metal can be fabricated by well known methods such as sintering pressed metal powder.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An anode electrode for use in a fuel cell, comprising:
an electrode body, said anode electrode having at least one anode electrical terminal and having at least a conductive external surface, said electrode body having at least one cavity defined within said electrode body, said cavity configured to contain a fuel-bearing liquid, said electrode body configured to allow controlled leakage of said fuel-bearing liquid from said cavity to an external surface of said electrode body, said electrode body having defined therein at least one aperture configured to allow fuel-bearing liquid to enter said electrode body, said electrode body configured to have a biologically active film on said external surface of said anode electrode and configured not to have a biologically active film within said at least one cavity within said anode electrode.

2. The anode electrode for use in a fuel cell of claim 1, in combination with:
a fuel cell housing configured to have situated therewithin said anode electrode and configured to have situated therewithin at least one cathode electrode; and
at least one cathode electrode having at least one cathode electrode electrical terminal.

3. The anode electrode for use in a fuel cell of claim 2, wherein said fuel cell housing lacks a semi-permeable membrane between said anode and said cathode.

4. The anode electrode for use in a fuel cell of claim 1, wherein said electrode body comprises graphite.

5. A method of operating an aerobic microbial fuel cell, comprising the steps of:

providing an anode electrode comprising an electrode body, said anode electrode having at least one anode electrical terminal and having at least a conductive external surface, said electrode body having at least one cavity defined within said electrode body, said cavity configured to contain a fuel-bearing liquid, said electrode body configured to allow controlled leakage of said fuel-bearing liquid from said cavity to an external surface of said electrode body, said electrode body having defined therein at least one aperture configured to allow fuel-bearing liquid to enter said electrode body from a supply of fuel-bearing liquid;
providing a fuel cell housing configured to have situated therewithin said anode electrode and configured to have situated therewithin at least one cathode electrode, said fuel cell housing lacking a semi-permeable membrane between said anode electrode and said cathode electrode;
providing a cathode electrode having at least one cathode electrode electrical terminal;
providing a biologically active film on said external surface of said anode electrode;
providing a supply of fuel-bearing fluid in fluid communication with said at least one aperture configured to allow fuel-bearing liquid to enter said electrode body;
providing a supply of oxidizer in a fluid external to said anode electrode; and
connecting a load circuit external to said aerobic microbial fuel cell.

6. The method of operating an aerobic microbial fuel cell of claim 5, wherein said fuel-bearing fluid comprises acetate.

7. The method of operating an aerobic microbial fuel cell of claim 5, wherein said fuel-bearing fluid comprises an oxidizable substance.

8. An aerobic microbial fuel cell, comprising:
an anode electrode comprising an electrode body, said anode electrode having at least one anode electrical terminal and having at least a conductive external surface, said electrode body having at least one cavity defined within said electrode body, said cavity configured to contain a fuel-bearing liquid, said electrode body configured to allow controlled leakage of said fuel-bearing liquid from said cavity to an external surface of said electrode body, said electrode body having defined therein at least one aperture configured to allow fuel-bearing liquid to enter said electrode body;
a biologically active film on said external surface of said anode electrode;
a fuel cell housing configured to have situated therewithin said anode electrode and configured to have situated therewithin at least one cathode electrode, wherein said fuel cell housing lacks a semi-permeable membrane between said anode electrode and said cathode electrode; and
at least one cathode electrode having at least one cathode electrode electrical terminal.

9. The aerobic microbial fuel cell of claim 8, wherein said electrode body comprises graphite.

* * * * *